United States Patent
Baudot

(10) Patent No.: US 9,354,396 B2
(45) Date of Patent: May 31, 2016

(54) LARGE BANDWIDTH MULTI-MODE INTERFERENCE DEVICE

(71) Applicant: STMICROELECTRONICS (CROLLES 2) SAS, Crolles (FR)

(72) Inventor: Charles Baudot, Lumbin (FR)

(73) Assignee: STMICROELECTRONICS (CROLLES 2) SAS, Crolles (FR)

(*) Notice: Subject to any disclaimer, the term of this patent is extended or adjusted under 35 U.S.C. 154(b) by 0 days.

(21) Appl. No.: 14/643,662

(22) Filed: Mar. 10, 2015

(65) Prior Publication Data

US 2015/0260918 A1 Sep. 17, 2015

(30) Foreign Application Priority Data

Mar. 17, 2014 (FR) .................................... 14 52194

(51) Int. Cl.
*G02B 6/28* (2006.01)
*G02B 6/34* (2006.01)
*G02B 6/125* (2006.01)
*G02B 6/122* (2006.01)
(Continued)

(52) U.S. Cl.
CPC .............. *G02B 6/2813* (2013.01); *G02B 6/122* (2013.01); *G02B 6/125* (2013.01); *G02B 6/12007* (2013.01); *G02B 6/2835* (2013.01); *G02B 6/34* (2013.01); *G02B 6/43* (2013.01); *G02B 6/1228* (2013.01); *G02B 2006/12097* (2013.01); *G02B 2006/12154* (2013.01); *G02B 2006/12159* (2013.01); *Y10T 29/49826* (2015.01)

(58) Field of Classification Search
CPC ........ G02B 6/34; G02B 6/125; G02B 6/2813; G02B 2006/12159; G02B 2006/12097; G02B 2006/12154; G02B 6/14; G02B 6/12007; G02B 6/122; G02B 6/1228; G02B 6/2835; G02B 6/43; Y10T 29/49826
USPC ............. 385/27–28, 30–31, 40–42, 129–131, 385/14, 24, 36, 37, 39, 43, 48
See application file for complete search history.

(56) References Cited

U.S. PATENT DOCUMENTS 6,108,478 A * 8/2000 Harpin ................. G02B 6/1228
385/129
6,266,464 B1 * 7/2001 Day .................... G02B 6/12011
385/14
(Continued)

FOREIGN PATENT DOCUMENTS

DE 102005054670- * 5/2007
DE 102005054670 A1 5/2007

OTHER PUBLICATIONS

Soldano et al., "Optical Multi-Mode interference Devices Based on Self-Imaging: Principles and Applications," Journal of Lightwave Technology, vol. 13, No. 4, Apr. 1995, pp. 615-627.
(Continued)

*Primary Examiner* — Akm Enayet Ullah
*Assistant Examiner* — Michael Mooney
(74) *Attorney, Agent, or Firm* — Allen, Dyer, Doppelt, Milbrath & Gilchrist, P.A.

(57) ABSTRACT

A multi-mode interference device may include a body having an optical axis and configured to generate a stationary optical interference pattern from an incoming optical wave. The body may include ribs being parallel to the optical axis and being spaced apart to define a pitch and cause an optical coupling between the ribs.

19 Claims, 4 Drawing Sheets

(51) Int. Cl.
*G02B 6/43* (2006.01)
*G02B 6/12* (2006.01)

(56) References Cited

U.S. PATENT DOCUMENTS

| | | | |
|---|---|---|---|
| 2002/0126976 A1* | 9/2002 | Day | G02F 1/025 385/130 |
| 2002/0172460 A1 | 11/2002 | Tyan et al. | |
| 2009/0162007 A1* | 6/2009 | Hamada | G02B 6/12007 385/14 |

OTHER PUBLICATIONS

West et al., "Optimization of non-ideal multimode interference devices," Science Direct Optics Communications 279, 2007, pp. 72-78.

Maur et al., A Design Procedure for High-Performance, Rib-Waveguide-Based Multimode Interference Couplers in Silicon-on-Insulator, Journal of Lightwave Technology, vol. 26, No. 16, Aug. 15, 2008, pp. 2928-2936

* cited by examiner

LARGE BANDWIDTH MULTI-MODE INTERFERENCE DEVICE

TECHNICAL FIELD

The present disclosure relates to optical components and, more particularly, to an optical power splitter.

BACKGROUND

A multi-mode interference device (MMI) is generally in the form of a parallelepiped slab (body) of a material suitable for transmission of a selected optical wavelength. Such devices are used primarily in silicon on insulator (SOI) optical circuits. MMI devices and applications are described, for example, in "Optical Multi-Mode Interference Devices Based on Self-Imaging: Principles and Applications", Lucas B. Soldano and Erik C M Pennings, Journal Of Lightwave Technology, Vol. 13, No. 4, Apr. 1995.

FIG. 1 shows an optical power distribution obtained in an exemplary MMI device. The power levels are represented in a gray scale, from white for the lowest level, to black for the highest level. The center of the lower face of the device receives an optical power Pin supplied through a waveguide. The incident wave propagates omnidirectionally in the slab and is reflected on the faces of the slab, causing a stationary interference pattern. The pattern depends on the dimensions of the slab, on the wavelength, and on the refractive index. In various cross sections of the slab patterns called "modes" are formed, where power is evenly distributed among an integer number of equally spaced knots. FIG. 1 identifies several modes Mx, where x denotes the number of power nodes.

Thus, by suitably choosing the length of the slab, it is possible, in theory, to extract from the upper face a desired integer number of optical waves of the same power. In the example of FIG. 1, a 1-to-3 splitter (denoted 1×3) is achieved by choosing the length of the slab so that the interference pattern stops on a three-node mode M3.

The longitudinal position of the desired mode varies depending on the dimensions of the slab, the refractive index, and the wavelength. These parameters are dependent on temperature. When the MMI device is made of silicon and embedded with electronic control circuits, the dependence of the parameters on temperature is such that the device may become inoperative in temperature ranges usually encountered in electronic circuits.

SUMMARY

Generally speaking, a multi-mode interference device may include a body having an optical axis and configured to generate a stationary optical interference pattern from an incoming optical wave. The body may include ribs being parallel to the optical axis and being spaced apart to define a pitch and cause an optical coupling between the ribs.

DETAILED DESCRIPTION

Generally speaking, an MMI is provided herein, comprising a slab of generally parallelepiped shape adapted by its dimensions and material to generate a stationary optical interference pattern from an incoming optical wave. The slab comprises at least three ribs parallel to the axis of the incoming optical wave and arranged according to a pitch that causes an optical coupling between the ribs. A first rib and a portion of the slab may extend at a first end of the device beyond the other ribs to form an optical input of the device.

At least one rib and a second portion of the slab may extend, at the second end of the device, beyond the other ribs to form an optical output of the device. The optical input and the optical output may be configured to connect to rib waveguides. The ribs may converge in groups, at the second end of the device, towards collection ribs. The collection ribs and a portion of the slab extend to form optical outputs of the device. The ribs may have differing widths or gaps adapted to a desired power distribution at the output of the device. The area of the slab occupied by the ribs may have a smaller width than the slab, and the rib waveguides may be wider than the area occupied by the ribs.

An optical power splitter derived from an MMI device is disclosed herein, which has an inherent robustness to temperature variations. This splitter is achieved by joining a particular directional coupler to an MMI device.

Figure 2A:
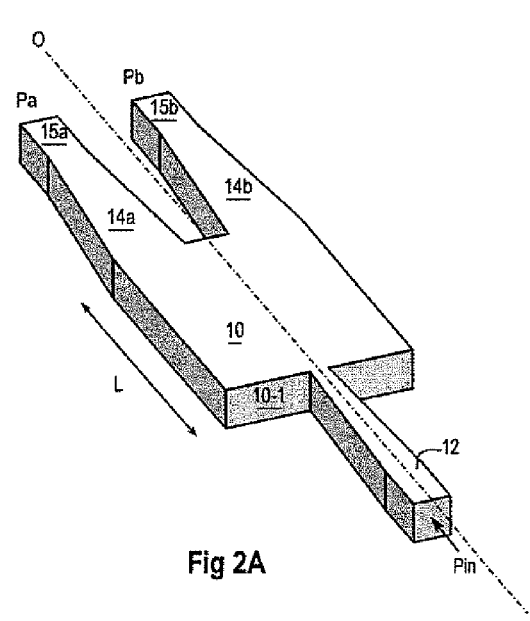
FIGS. 2A and 2B show an exemplary 1×2 silicon MMI device and a map of the power transmitted on each outgoing channel according to the length of the device and the wavelength, according to the present disclosure.

Individual behaviors on an exemplary 1×2 MMI device and of a particular example of a 1×2 directional coupler will be first discussed. FIG. 2A shows an exemplary 1×2 silicon MMI device. It includes a generally flat parallelepiped slab 10. In SOI technology, the slab typically has a height of 300 nm. For processing infrared optical waves with wavelengths of about 1.3 microns, the width of the slab (dimension transverse to the optical axis O) is approximately 4 microns. The length of the slab (parallel to the optical axis O) is denoted by L.

An optical power Pin is supplied to the center of one (front) face 10-1 of the slab by a waveguide 12. This configuration corresponds to a balanced MMI device. In other embodiments, the input may be offset laterally to unbalance the output powers. The guide 12 may have tapered in sides as it approaches the face 10-1, through a prismatic portion. With this configuration of the guide 12, a greater mode dispersion is obtained at the input of the MMI device. In another embodiment, the guide may have tapered out sides, thereby reducing optical losses induced by reflection on the face 10-1.

Two prisms 14a and 14b, symmetrical with respect to the optical axis O, collect the power output at the rear face of the slab, and divide it between two waveguides 15a and 15b. The prisms 14a, 14b may be sufficiently spaced from one another to avoid optical coupling between the guides. The length L of the slab may be tuned in this configuration for an even number output mode, so that half the power nodes are covered by the prism 14a, and the other half by the prism 14b. This provides a balanced distribution of the optical power in the two outgoing guides.

Figure 2B:
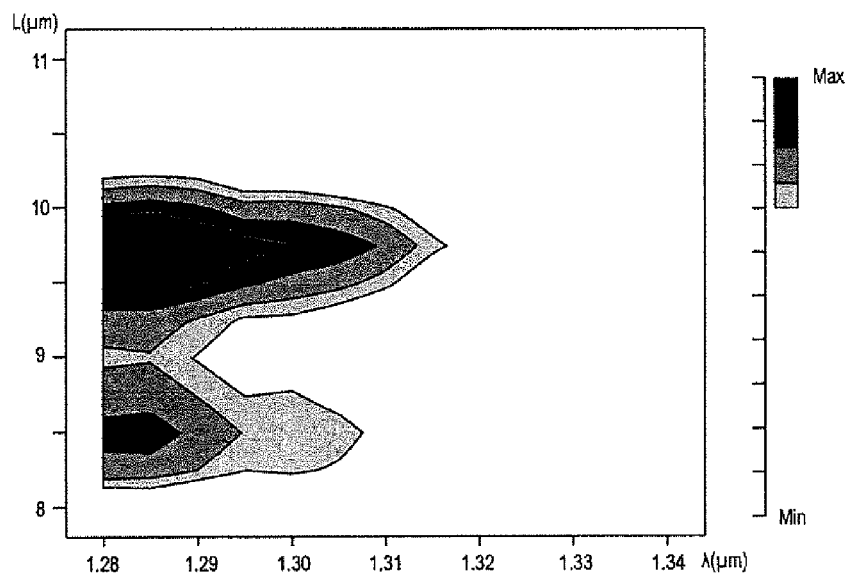

FIG. 2B shows an example of an optical power map obtained in one of the outgoing guides 15a, 15b, depending on the length L in microns and the wavelength. These values have been obtained by simulation on a slab of SOI silicon having a height of 300 nm and a width of 4 microns. The waveguides have a width of 0.4 microns, and the prism portions have a length of 10 microns. The connection of guide 12 with face 10-1 has a width of 0.2 microns. The power levels are expressed by shades of gray, white corresponding to the lowest levels, and black corresponding to the highest levels.

This map has no temperature scale, but the influence of temperature on the optical power can be translated by an equivalent variation of the wavelength. Thus, to obtain an MMI device insensitive to variations in temperature, the bandwidth of the device is extended, that is to say, the width of the black area. A zone of maximum power is observed extending at most between 1.28 and 1.30 microns in wavelength, for L=9.75 microns.

To distribute an optical power between two outputs, a device called a "directional coupler" may also be used. In coupling two waveguides sufficiently, an optical coupling is obtained that transmits a fraction of the power of one guide to the other. A feature of directional couplers is that the coupling is achieved with little optical loss. However, the power fraction transmitted through coupling depends on the dimensional accuracy of the gap between the guides and the facing length of the guides, so that, unlike MMI devices, the power distribution of the outputs of the coupler is difficult to control accurately, and is temperature dependent.

Figure 3A:
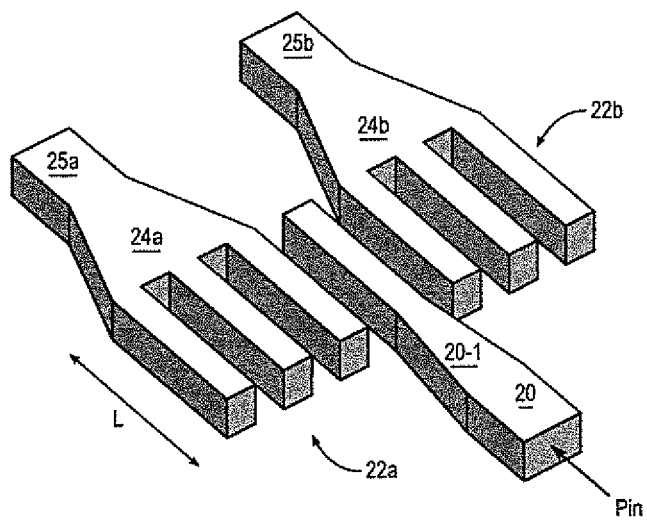
FIGS. 3A and 3B show an exemplary 1×2 silicon directional coupler and a map of the power transmitted on each outgoing channel according to the length of the device and the wavelength, according to the present disclosure.

FIG. 3A shows an embodiment of a 1×2 directional coupler having a specific structure. The structure here is symmetrical about a central waveguide 20 leading-in the light power Pin. The guide 20 stops at one end of the device and its terminal portion has a coupling length L. On either side of the terminal portion of the guide 20 are arranged two groups 22a, 22b of fingers of length L, parallel to the guide 20 and that may be of the same material as the guide. The gaps between the fingers and the guide 20, and the widths of the fingers are chosen so that optical coupling is established, and in particular here so that all the optical power arriving via the guide 20 is distributed between the two adjacent fingers.

With this configuration, the power transmitted by coupling into each of the fingers 22 is redistributed between the finger itself and the next finger. With groups of three fingers, an exemplary theoretical power distribution of 25%, 12.5%, and 12.5% may be obtained starting from the finger closest to guide 20.

The outputs from the fingers 22a and 22b are channeled through two prisms 24a, 24b to two waveguides 25a, 25b sufficiently apart to prevent optical coupling. The input guide 20 may include a prismatic portion 20-1 to adapt the width of the terminal portion of the guide to the width of the fingers 22.

Figure 3B:
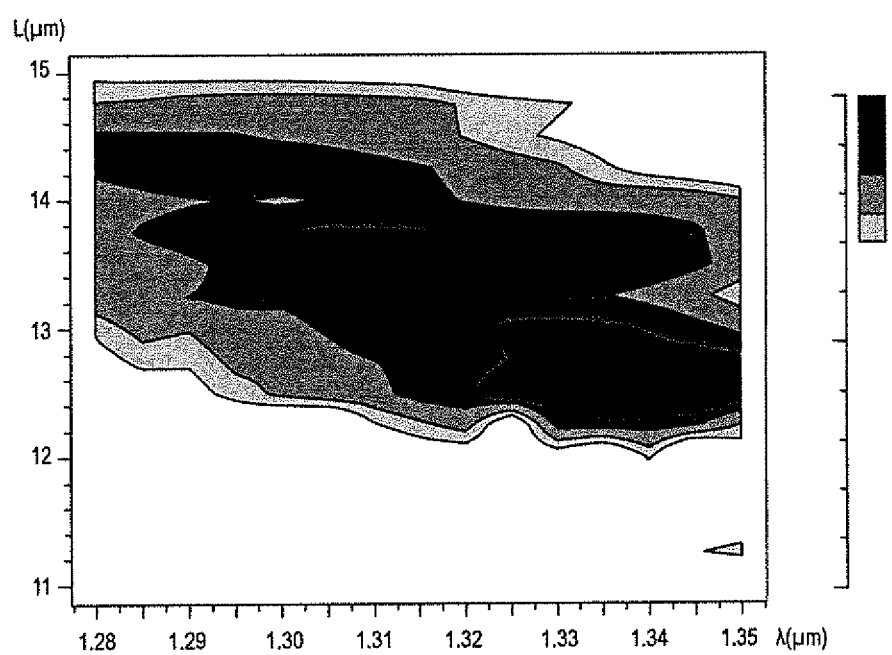

FIG. 3B shows an exemplary optical power map obtained in one of the outgoing guides 25a, 25b, depending on the length L in microns and the wavelength. These values were obtained by a simulation performed on an SOI structure having a 300 nm height. The waveguides have a width of 0.4 microns and the prism portions have a length of 10 microns. The fingers 22 and the terminal portion of the guide 20 have a width of 0.2 microns, and the gaps therebetween are also 0.2 microns wide. (FIG. 3A shows the device according to an expanded transverse scale, the device being much longer than wide.) The power levels are expressed by shades of gray, white corresponding to the lowest levels, and black corresponding to the highest levels.

A zone of maximum power is observed extending between 1.32 and 1.35 microns in wavelength, for a length L between 12.3 and 13.1 microns. This zone is larger than for the MMI device of FIG. 2A. A structure of the type of FIG. 3A, used alone, may have no advantage for realizing a 1×2 directional coupler as it was designed to be combined with an MMI device for modifying its interference properties, as discussed below.

Figure 4A:
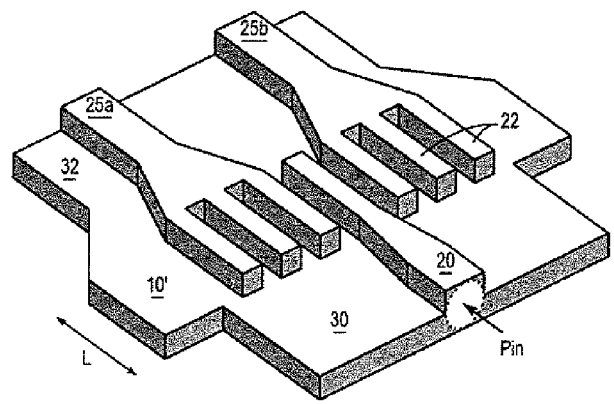
FIGS. 4A-4C show an embodiment of a 1×2 power splitter based on a modified MMI device, an exemplary corresponding optical interference pattern, and a map of the power transmitted on each outgoing channel based on the length of the device and the wavelength, according to the present disclosure.

FIG. 4A shows an embodiment of such a modified 1×2 MMI device. The particular directional coupler of FIG. 3A is superimposed on an MMI device to form a monolithic whole comprised of a slab having a general parallelepiped shape 10' topped by parallel ribs corresponding to the fingers 22 and the terminal portion of waveguide 20. (Same references as in FIG. 3A are used to designate corresponding elements.)

As shown, the ribs 22 may populate only a fraction of the width of the slab. The ribs preferably populate the surface where the power nodes of the interference pattern form, but only three ribs may be provided in certain applications: one rib for the incoming guide 20, and one rib for each of the outgoing guides 25a, 25b. The ribs are shown as being narrower than the guides, but in certain applications the ribs may be wider.

In some embodiments, the front and rear faces of the slab 10' are not materialized at the ends of the ribs 22, which could cause spurious reflections affecting the desired coupling effect between the ribs. Thus, as shown, the slab 10' is extended along the incoming guide 20 by a portion 30 wider than the area occupied by the ribs. The portion 30 may extend laterally from the area occupied by the ribs by about the size of the gap provided between the ribs. In fact, the portion 30 and the guide 20 form together a so-called "rib waveguide" that proves to be particularly suitable for this modified MMI device. Similarly, the two output ribs 25a, 25b of the device may be connected to a dual-rib waveguide 32 of same width as the portion 30, as shown. The slab 10 is then connected to the base of the guide 32 by a prismatic portion.

In an SOI structure simulated hereinafter, the slab 10' and the ribs have a height of 150 nm. The ribs are spaced by 0.2 microns and are 0.2 microns wide. The slab 10' and the ribs 22 have the same length L. The slab has a width of 4 microns. The prism portions and the slab 10' (L) have a length of about 10 microns. Thus, the transverse scale of the drawings has been extended.

Figure 4B:
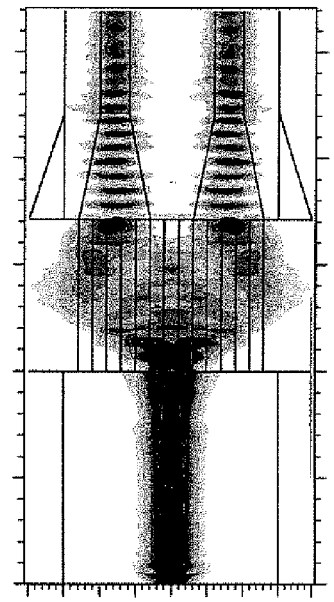

FIG. 4B shows an optical interference pattern obtained under these conditions, for a wavelength of about 1.3 microns, the power being expressed on a gray scale from white for the lowest levels, to black for the highest levels. The outlines of the device of FIG. 4A are illustrated in this figure.

Figure 1:
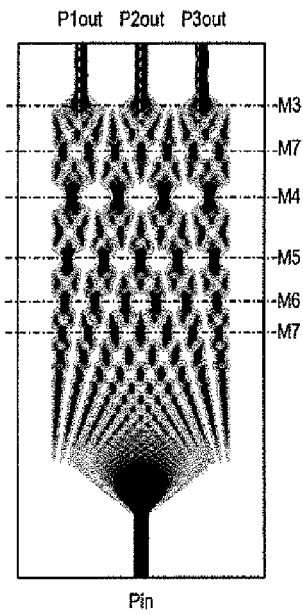
FIG. 1 shows an optical interference pattern in an MMI device, according to the prior art.

The observed pattern is neither that of a conventional MMI device (FIG. 1), nor that of a directional coupler of the type of FIG. 3A. The association of the two types of power splitters produces a result that is not the sum of the effects of the individual splitters. Indeed, the two types of splitters do not operate independently, because, in particular, a vertical optical transmission appears between the ribs and the slab.

Figure 4C:
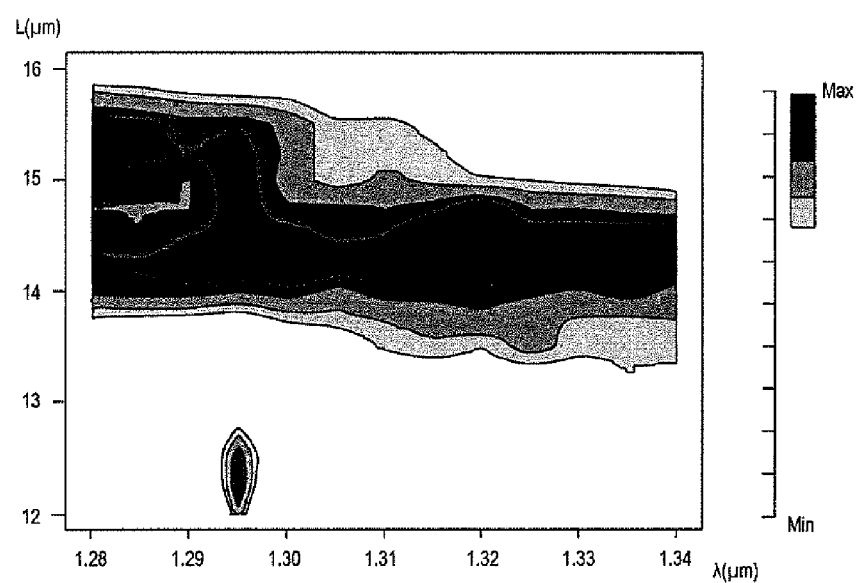

FIG. 4C is an optical power map obtained in one of the outgoing guides 25a, 25b, depending on the length L in microns and the wavelength. This map does not correspond to the sum of the maps of FIGS. 2B and 3B. It exhibits a maximum power zone extending over the whole measured band, between 1.28 and 1.34 microns in wavelength, for a length L close to 14.25 microns. The configuration of the map suggests that the band is even wider. It follows that the structure retains its characteristics over a range of temperatures reflecting a change in wavelength greater than 60 nm.

Figure 5:
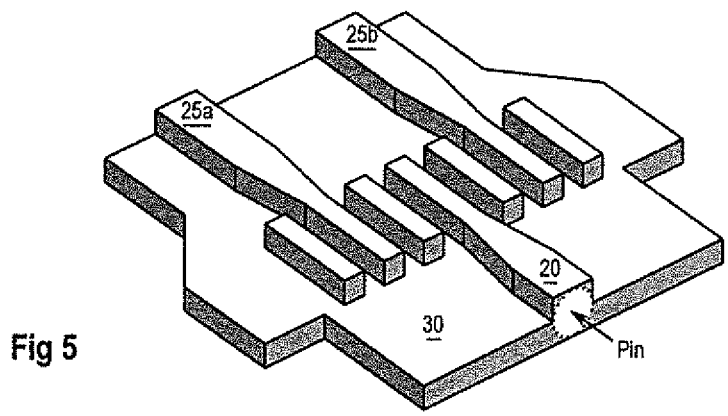
FIG. 5 shows an alternative embodiment of the device of FIG. 4A, according to the present disclosure.

FIG. 5 shows an alternative embodiment of the device of FIG. 4A. As shown in FIG. 4B, for the numerical values considered as an example, the outgoing power is concentrated at the ribs of positions 2 and 6. Virtually no power is output from the other ribs (ribs of positions 1, 3, 4, 5 and 7). In this case, the prism portions serving to collect the outgoing waves from these other ribs may be omitted (See FIG. 5). Only the ribs of positions 2 and 6 are connected to the guides 25a and 25b.

As previously disclosed, a conventional MMI device has the feature of evenly distributing the optical power over an integer number of outputs. This feature is more approximate in reality when the number of outputs is an odd number. In a 1×3 MMI device, power is balanced between the two outgoing side channels, but the outgoing central channel often carries a higher power. To adjust the power of the central channel in a conventional MMI device, the connection of the outgoing central waveguide may be sized to collect only part of the power. The excess power is then lost through the rear face of the slab, which further reduces the usable range of the device. A ribbed MMI device of the type of FIG. 4A offers a certain degree of adjustment of the individual outgoing channels without loss of power, using the optical coupling properties between the ribs 22.

Figure 6A:
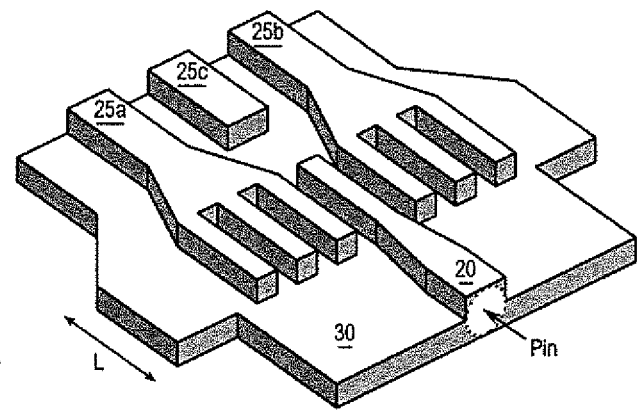
FIGS. 6A and 6B show an embodiment of a 1×3 MMI device modified according to two alternative rib configurations, according to the present disclosure.

FIG. 6A shows an embodiment of a 1×3 ribbed MMI device. The length L of the slab is chosen to obtain a mode with three power nodes at the output. The same number of ribs (seven) as in previously described devices may be used. Indeed, the number of ribs does not necessarily correspond to the number of nodes of the selected mode. The ribs act globally to create a new type of interference pattern also having multiple transverse modes. Thus, in some configurations, the nodes of the mode chosen for the output may be misaligned with the ribs. A rib however has a node-attraction power, whereby nodes in a same mode may not be evenly distributed, each node having a tendency to approach the nearest rib.

Thus, in FIG. 6A, the same rib configuration as in FIG. 4A may be used, but the length L may be different. The side power nodes are channeled to the guides 25a and 25b. The third node, in the center, is channeled to a guide 25c that is not connected to any rib. With this configuration, the fraction of the power transmitted by coupling between the ribs 22 arrives exclusively to the side guides and is subtracted from the central guide 25c. This noticeably reduces the power in the central channel to balance the three channels.

Figure 6B:
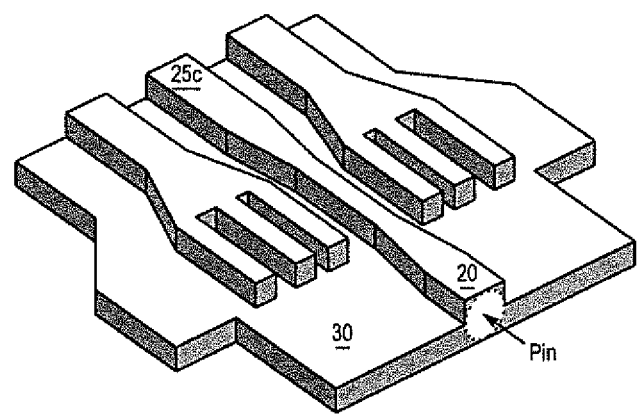

FIG. 6B illustrates an alternative 1×3 ribbed MMI device. Here, the outgoing central guide 25c is connected to the central rib. It is desired that a fraction of the power in the central rib be transmitted to the guide 25c. This fraction may be adjusted using the offset between the center rib and each of the adjacent ribs (ribs at positions 3 and 5).

In the configuration of FIG. 6A, it was considered that all the power of the center rib was coupled to the adjacent ribs. By using the same scale in FIG. 6B, the gap between the central rib and the neighboring ribs is increased, so that a fraction of power remains in the central rib to be transmitted to the guide 25c. An equivalent effect may be obtained by reducing the width of the central rib.

Any change in the width of the ribs or their spacing may cause global changes of the interference pattern of the device. Thus, in practice, the individual power level adjustments of the output channels of the device may be less intuitive in practice than what is mentioned above. What is certain is that these parameters may be used to act individually on the power levels of the channels. If the effects are difficult to quantify by calculation, they can be quantified by simulation or real tests.

Many variations of the embodiments described herein will become apparent to those skilled in the art. Although optical power splitters have been described with a single central input, the principles described are applicable to multiple-input splitters, or offset input splitters.

That which is claimed is:

1. A multi-mode interference device comprising:
a body having an optical axis and configured to generate a stationary optical interference pattern from an incoming optical wave;
said body comprising a plurality of optical waveguide ribs being parallel to the optical axis and being spaced apart to define a pitch for causing an optical coupling between said plurality of optical waveguide ribs;
a first optical waveguide rib from said plurality thereof extending beyond other optical waveguide ribs from said plurality thereof to define an optical input;
at least one optical waveguide rib from said plurality thereof extending beyond other optical waveguide ribs from said plurality thereof to define an optical output.

2. The multi-mode interference device of claim 1 wherein said body has a parallelepiped shape with dimensions and at least one material characteristic; and wherein said body is configured to generate the stationary optical interference pattern based upon the dimensions and the at least one material characteristic.

3. The multi-mode interference device of claim 1 further comprising a base having opposing first and second ends, the optical axis extending between the first and second ends; and wherein a portion of said base adjacent the first end extends beyond the other optical waveguide ribs from said plurality thereof to further define the optical input.

4. The multi-mode interference device of claim 3 wherein a portion of said base adjacent the second end extends beyond the other optical waveguide ribs from said plurality thereof to further define the optical output.

5. The multi-mode interference device of claim 4 wherein the optical input and the optical output are optically coupled to said plurality of optical waveguide ribs.

6. The multi-mode interference device of claim 3 further comprising a plurality of collection optical waveguide ribs; wherein said plurality of optical waveguide ribs converges in groups adjacent the second end and towards said plurality of collection optical waveguide ribs; and wherein said plurality of collection optical waveguide ribs and a portion of said base adjacent the second end extend to further define the optical output comprising a plurality of optical outputs.

7. The multi-mode interference device of claim 1 wherein said plurality of optical waveguide ribs has differing widths configured to generate a desired power distribution at the optical output.

8. The multi-mode interference device of claim 1 wherein adjacent pairs of said plurality of optical waveguide ribs have differing pitches configured to generate a desired power distribution at the optical output.

9. The multi-mode interference device of claim 1 further comprising a base having opposing first and second ends, the optical axis extending between the first and second ends; and wherein an area of said body occupied by said plurality of optical waveguide ribs has a width less than that of said base.

10. A multi-mode interference device comprising:
an optical waveguide base;
a plurality of optical waveguide ribs over said optical waveguide base;

a first optical waveguide rib from said plurality thereof extending beyond other optical waveguide ribs from said plurality thereof to define an optical input over said optical waveguide base and configured to receive an incoming optical wave;

said plurality of optical waveguide ribs being coupled to said optical input, and extending parallel to an optical axis and configured to generate a stationary optical interference pattern from the incoming optical wave; and at least one optical waveguide rib from the plurality thereof extending beyond other optical waveguide ribs from said plurality thereof to define an optical output over said optical waveguide base and coupled to said plurality of optical waveguide ribs;

said plurality of optical waveguide ribs being spaced apart to define a pitch for causing an optical coupling between said plurality of optical waveguide ribs.

11. The multi-mode interference device of claim 10 wherein said optical waveguide base and said plurality of optical waveguide ribs have a parallelepiped shape with dimensions and at least one material characteristic; and wherein said optical waveguide base and said plurality of optical waveguide ribs are configured to generate the stationary optical interference pattern based upon the dimensions and the at least one material characteristic.

12. The multi-mode interference device of claim 10 further comprising at least one prism coupled to said plurality of optical waveguide ribs to further define the optical output.

13. The multi-mode interference device of claim 10 wherein said plurality of optical waveguide ribs has differing widths configured to generate a desired power distribution at the optical output.

14. The multi-mode interference device of claim 10 wherein adjacent pairs of said plurality of optical waveguide ribs have differing pitches configured to generate a desired power distribution at the optical output.

15. A method of making a multi-mode interference device comprising:

forming an optical input from a first optical waveguide rib from a plurality thereof, the first optical waveguide rib extending beyond other optical waveguide ribs from the plurality thereof, the optical input being over an optical waveguide base and to receive an incoming optical wave;

forming the plurality of optical waveguide ribs over the optical waveguide base, coupled to the optical input, and extending parallel to an optical axis and to generate a stationary optical interference pattern from the incoming optical wave; and forming an optical output from at least one optical waveguide rib from the plurality thereof, the at least one optical waveguide rib extending beyond other optical waveguide ribs from the plurality thereof, the optical output being over the optical waveguide base and coupled to the plurality of optical waveguide ribs;

the plurality of optical waveguide ribs being spaced apart to define a pitch for causing an optical coupling between the plurality of optical waveguide ribs.

16. The method of claim 15 wherein the optical waveguide base and the plurality of optical waveguide ribs have a parallelepiped shape with dimensions and at least one material characteristic; and wherein the optical waveguide base and the plurality of optical waveguide ribs generate the stationary optical interference pattern based upon the dimensions and the at least one material characteristic.

17. The method of claim 15 further comprising forming at least one prism coupled to the plurality of optical waveguide ribs to further define the optical output.

18. The method of claim 15 wherein the plurality of optical waveguide ribs has differing widths configured to generate a desired power distribution at the optical output.

19. The method of claim 15 wherein adjacent pairs of the plurality of optical waveguide ribs have differing pitches configured to generate a desired power distribution at the optical output.

* * * * *